United States Patent
Kapit

(10) Patent No.: US 10,956,267 B2
(45) Date of Patent: Mar. 23, 2021

(54) SYSTEMS AND METHODS FOR PASSIVE QUANTUM ERROR CORRECTION

(71) Applicant: THE ADMINISTRATORS OF THE TULANE EDUCATIONAL FUND, New Orleans, LA (US)

(72) Inventor: Eliot Kapit, New Orleans, LA (US)

(73) Assignee: THE ADMINISTRATORS OF THE TULANE EDUCATIONAL FUND, New Orleans, LA (US)

( * ) Notice: Subject to any disclaimer, the term of this patent is extended or adjusted under 35 U.S.C. 154(b) by 75 days.

(21) Appl. No.: 16/368,539

(22) Filed: Mar. 28, 2019

(65) Prior Publication Data
US 2019/0303242 A1    Oct. 3, 2019

(51) Int. Cl.
| | | |
|---|---|---|
| G11C 29/00 | (2006.01) | |
| G06F 11/10 | (2006.01) | |
| G06N 10/00 | (2019.01) | |

(52) U.S. Cl.
CPC ......... G06F 11/1076 (2013.01); G06N 10/00 (2019.01)

(58) Field of Classification Search
None
See application file for complete search history.

(56) References Cited

U.S. PATENT DOCUMENTS

| | | |
|---|---|---|
| 7,135,701 B2 | 11/2006 | Amin et al. |
| 8,504,497 B2 | 8/2013 | Amin |
| 2016/0267032 A1* | 9/2016 | Rigetti ................... G06N 10/00 |

OTHER PUBLICATIONS

Eliot Kapit, Error-transparent quantum gates for small logical qubit architectures, Mar. 28, 2017, Department of Physics and Engineering Physics, Tulane University, New Orleans, V1 (Year: 2017).*
Albash et al. (2018) "Adiabatic Quantum Computing," arXiv:1611.04471v2 [quant-ph] Feb. 2, 2018, 71 pp.
Battaglia et al. (2005) "Optimization by Quantum Annealing: Lessons from hard 3-SAT cases," arXiv:cond-mat/0502468v1 [cond-mat.dis-nn] Feb. 18, 2005, 10 pp.
Bouchiat et al. (1998) "Quantum Coherence with a Single Cooper Pair," Physica Scripta., vol. T76, pp. 165-170.
Chen et al. (2014) "Qubit architecture with high coherence and fast tunable coupling," Phys. Rev. Lett., 113, 220502, 10 pp.
Chiarello (2006) "Tunable Flux Qubit manipulated by fast pulses: operating requirements, dissipation and decoherence," The European Physical Journal B—Condensed Matter and Complex Systems, 55, 6 pp.

(Continued)

Primary Examiner — Guerrier Merant
(74) Attorney, Agent, or Firm — Lathrop GPM LLP

(57) ABSTRACT

Error-transparent quantum gates may be implemented with one or two logical qubits, each having a plurality of coupled physical qubits. Error-transparent quantum gates implement Hamiltonians that commute with the Hamiltonian for single errors in the logical qubits, and thus can operate successfully even in the presence of single errors. As a result, error-transparent quantum gates may operate with higher fidelity than their error-opaque counterparts. Each of the logical qubits may be, for example, a very small logical qubit (VSLQ) formed from a cluster of transmons or other superconducting qubits.

18 Claims, 6 Drawing Sheets

(56) References Cited

OTHER PUBLICATIONS

Chiarello et al. (2006) "Realization and characterization of a squid flux qubit with a direct readout scheme," Quantum Computing in Solid State Systems, Springer, New York, NY, 8 pp.
Denchev et al. (2016) "What is the Computational Value of Finite-Range Tunneling?" Physical Review X 6, 031015, 19 pp.
Didier et al. (2015) "Fast quantum non-demolition readout from longitudinal qubit-oscillator interaction," Phys. Rev. Lett., 115, 203601, 14 pp.
Fujii (2018) "Quantum speedup in stoquastic adiabatic quantum computation," arXiv:1803.09954v1 [quant-ph] Mar. 27, 2018, 9 pp.
Glaetzle et al. (2017) "A coherent quantum annealer with Rydberg atoms," Nature Communications, DOI: 10.1038/ncomms15813, 6 pp.
Isakov et al. (2015) "Understanding Quantum Tunneling through Quantum Monte Carlo Simulations," arXiv:1510.08057v1 [quant-ph] Oct. 27, 2015, 15 pp.
Kadowaki et al. (1998) "Quantum annealing in the transverse Ising model," Physical Review E, vol. 58, No. 5, 9 pp.
Kapit (2015) "A Very Small Logical Qubit," arXiv:1510.06117v1 [quant-ph] Oct. 21, 2015, 9 pp.
Kapit et al. (2016) "Passive correction of quantum logical errors in a driven, dissipative system: a blueprint for an analog quantum code fabric," nonlineariarXiv: 1408.0959v1 [quant-ph] Aug. 5, 2014, 19 pp.
Kechedzhi et al. (2018) "Efficient population transfer via non-ergodic extended states in quantum spin glass," arXiv:1807.04792v1 [quant-ph] Jul. 12, 2018, 16 pp.
Khaneja et al. (2005) "Optimal Control of Coupled Spin Dynamics: Design of NMR Pulse Sequences by Gradient Ascent Algorithms," J. Mag. Res., 172, pp. 296-305.
Knysh (2016) "Computational Bottlenecks of Quantum Annealing," arXiv:1506.08608v2 [quant-ph] May 17, 2016, 12 pp.
Koch et al. (2007) "Charge insensitive qubit design derived from the Cooper pair box," arXiv:cond-mat/0703002v2 [cond-mat.mes-hall] Sep. 26, 2007, 21 pp.
McKay et al. (2016) "A universal gate for fixed-frequency qubits via a tunable bus," arXiv: 1604.03076, 10 pp.
Rosenberg et al. (2015) "Building an iterative heuristic solver for a quantum annealer," arXiv:1507.07605v2 [cs.DM] Aug. 28, 2015, 21 pp.
Rubbmark et al. (1981) "Dynamical effects at avoided level crossings: A study of the Landau-Zener effect using Rydberg atoms," Physical Review A, vol. 23, No. 6, 11 pp.
Santoro et al. (2002) "Theory of Quantum Annealing of an Ising Spin Glass," arXiv:cond-mat/0205280v1 [cond-mat.dis-nn] May 14, 2002, 8 pp.
Wendin et al. (2005) "Superconducting Quantum Circuits, Qubits and Computing," arXiv:cond-mat/0508729v1 [cond-mat.supr-con] Aug. 30, 2005, 60 pp.

* cited by examiner

SYSTEMS AND METHODS FOR PASSIVE QUANTUM ERROR CORRECTION

RELATED APPLICATIONS

This application claims priority to Canadian Patent Application Number 2999554, filed Mar. 28, 2018, which is incorporated herein by reference in its entirety.

FIELD OF THE INVENTION

The subject application generally relates to quantum computing, and in particular to a quantum information system and a complex quantum information system comprising same.

BACKGROUND

One of the largest obstacles to building a quantum computer is gate error, where the physical evolution of the state of a qubit or group of qubits during a gate operation does not match the intended unitary transformation. Gate error stems from a combination of control errors and random single qubit errors from interaction with the environment. While great strides have been made in mitigating control errors, intrinsic qubit error remains a serious problem that sets the primary limit for gate fidelity in modern superconducting qubit architectures. Simultaneously, recent developments of small error-corrected logical qubit devices promise significant increases in logical state lifetime, but translating those improvements into increases in gate fidelity is a complex challenge.

SUMMARY OF THE EMBODIMENTS

Embodiments herein provide a new formalism for implementing gates on and between small logical qubit devices that inherit the parent device's tolerance to single qubit errors which occur at any time before or during the gate. Using a standard phenomenological noise model for superconducting qubits, a universal one- and two-qubit gate set is demonstrated having error rates an order of magnitude lower than those for equivalent operations on single qubits or pairs of qubits, running for the same total duration. The effective logical gate error rate in these models displays superlinear error reduction with linear increases in single qubit lifetime, proving that passive error correction is capable of increasing gate fidelity. These developments further suggest that incorporating small logical qubits into a measurement-based code substantially improves code performance.

In one embodiment, an error-transparent two-qubit quantum circuit includes a first logical qubit formed from a first plurality of physical qubits, a second logical qubit formed from a second plurality of physical qubits, and one or more tunable couplers for entangling the first plurality of physical qubits with the second plurality of physical qubits. The one or more tunable couplers are driven to implement with the first and second logical qubits an error-transparent quantum gate that operates independently of single errors in the first and second logical qubits.

In another embodiment, a method implements an error-transparent quantum gate with first and second logical qubits. The first logical qubit includes a first plurality of physical qubits, and the second logical qubit includes a second plurality of physical qubits. The method includes off-resonantly driving one or more tunable couplers with one or more corresponding drive signals to entangle the first plurality of physical qubits with the second plurality of physical qubits. The drive signals are configured to implement with the first and second logical qubits an error-transparent quantum gate that operates independently of single errors in the first and second logical qubits.

In another embodiment, a method implements an error-transparent quantum gate with a logical qubit. The logical qubit includes at least first and second physical qubits. The method includes driving a tunable coupler with a first drive signal to couple the first and second physical qubits. The method also includes driving a degree of freedom of one of the first and second physical qubits with a second drive signal. The first and second drive signals are configured to apply to the logical qubit an error-transparent quantum gate that operates independently of single-photon errors in the logical qubit.

DETAILED DESCRIPTION OF EMBODIMENTS

Figure 1:
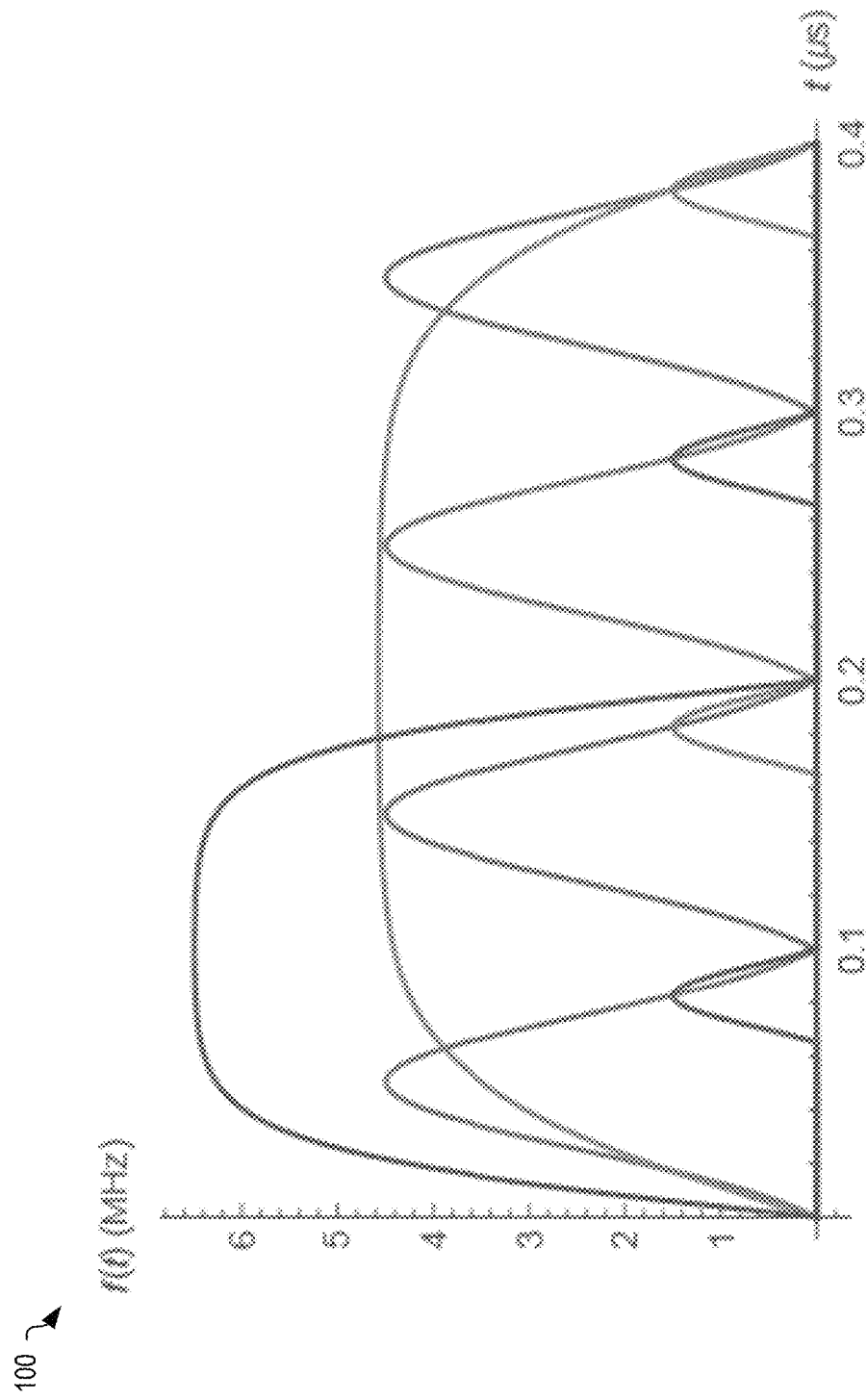
FIG. 1 is a plot of gate envelope functions for two-qubit gates spread out over two or four 100 ns error correction cycles.

Embodiments herein are used for quantum information processing with logical quantum-bit (i.e., qubit) clusters, each consisting of a plurality of physical qubits and resonators. The physical qubits are strongly coupled to each such that they cannot be operated properly as individual devices and only as a cluster. A qubit cluster can be interpreted as a Josephson junction circuit with a plurality of nonlinear quantum degrees of freedom, and a similar number of nearly linear resonator degrees of freedom. The collective quantum state of each cluster is protected by time-dependent, driven couplings to intentionally lossy circuit elements, with gate protocols implemented on and between logical qubit clusters. These clusters are designed to work synergistically with the error correction.

To build a fault-tolerant, error-corrected quantum computer, every operation (i.e., one-qubit and two-qubit gates, state preparation, measurement, and idling) must be performed with high fidelity. While high fidelities have been achieved in one-qubit gates, improving two-qubit gate performance is considerably more difficult, with experimentally realized gate error not far below the threshold rate. Furthermore, the classical processing required for a code involving tens or hundreds of millions of physical qubits is daunting, and increasing the cycle time to reduce this burden increases error rates, further degrading performance. An improved qubit primitive capable of higher two-qubit gate fidelities and state lifetimes could thus make it dramatically easier to implement a topological code.

Both of these challenges may be addressed with a passively error-corrected quantum circuit referred to herein as "Very Small Logical Qubit" (VSLQ), as described by E. Kapit in Phys. Rev. Lett. 116, 150501 (2016), which is incorporated herein by reference. Small logical qubit circuits have been used for the first experimental demonstration of a quantum error correction protocol that exceeds breakeven. However, due to the larger and more complex Hilbert space, error correction that increases idle lifetime does not necessarily improve gate fidelity.

Thus, embodiments herein implement engineered "error-transparent" quantum gates, where the physical Hamiltonians implementing these quantum gate are tailored to commute (or at least approximately commute) with single-qubit errors (e.g., photon loss) when acting on the logical state manifold, at all times during the gate operation. This criterion ensures that subsequent error correction will recover the correct (transformed) logical state regardless of when the error occurred during the gate operation. The error rate of such a quantum gate in the ideal limit would thus decrease as $T_g T_R / T_1^2$, where $T_g$ is a gate timescale, $T_R$ is an error correction timescale, and $T_1$ is a random error timescale. This scaling leads to large improvements in gate fidelity, as random one-qubit errors are the current limiting factor in well-designed architectures. These developments are similar to recent work for cat codes, where robust gate and measurement protocols have been proposed, though these schemes fall short of a complete universal gate set which is insensitive to single errors that occur at any random point during any gate.

These gates are referred to as "error-transparent" since they are resilient to one-qubit errors which occur before or during their operation. Error transparency is distinct from the more general notion of fault tolerance, typically interpreted as the ability to exponentially reduce logical error rates with a polynomial increase in circuit complexity. The small logical qubit circuits considered herein do not have an obvious scaling path, but perform well against single error events, and could potentially improve code performance by replacing single qubits in a larger measurement-based code.

The following sections describe how to implement an error-transparent gate set with VSLQs, and how to benchmark their performance through numerical simulation. Also demonstrated are superlinear decreases in gate error with increased $T_1$, and two-qubit gate error rates in the low $10^{-4}$ range that are achievable without further increases in base qubit coherence.

Very Small Logical Qubits (VSLQs)

A VSLQ consists of a pair of transmons coupled by a tunable, flux-driven coupler driven at high frequencies to coherently drive two- and four-photon transitions. Defining $\tilde{X}_i = (a_i^\dagger a_i^\dagger + a_i a_i)/\sqrt{2}$ and $P_i^j$ to be the projector onto states where object i contains exactly j photons, the rotating-frame VSLQ Hamiltonian, in the three-level basis of the left and right qubits l and r, is given by $$H_P = -W \tilde{X}_l \tilde{X}_r + \frac{\delta}{2}(P_l^1 + P_r^1). \quad (1)$$

The ground states of a VSLQ are the two states satisfying $\tilde{X}_l \tilde{X}_r = 1$. For the simulations disclosed herein, $W = (2\pi) \times 25$ MHz and $\delta = (2\pi) \times 300$ MHz. Given the phenomenological noise model for superconducting qubits of low-frequency phase noise and white noise photon loss, when coupled to additional lossy elements, the VSLQ acts as a logical qubit protected against all single qubit error channels. Specifically, two additional lossy "shadow" qubits (or resonators) are introduced, with circuit Hamiltonian $$H = H_P + H_S + H_{PS},$$

$$H_S = \omega_S (a_{Sl}^\dagger a_{Sl} + a_{Sr}^\dagger a_{Sr}),$$

$$H_{PS} = \Omega(t)(a_l^\dagger a_{Sl}^\dagger + a_r^\dagger a_{Sr}^\dagger + H.c.). \quad (2)$$

By carefully tuning $\omega_S$ and $\Omega(t)$, a photon loss in a primary qubit can be converted to an excitation in a shadow qubit, returning the VSLQ to its original logical state. By then introducing a fast loss rate for the shadow qubits, the shadow qubit excitation can be eliminated, returning the system to its rotating-frame ground state and completely eliminating the error. While phase errors cannot be corrected through this mechanism, the large W term introduces an energy penalty for phase errors. Since phase noise is low-frequency dominated, it is thus strongly suppressed (see FIG. 4 for quantitative simulations).

Pulsed Error Correction and Idle Error

In the original VSLQ publication of E. Kapit, Phys. Rev. Lett. 116, 150501 (2016), error correction (EC) was continuously applied with constant $\Omega$ and shadow qubit loss rate $\Gamma_S$. However, performance can be improved by running these error-correction drives as discrete pulses, as shown in FIG. 1. In this scheme, the shadow qubit lifetime is by default set equal to the lifetime of the primary qubits, but can be rapidly adjusted to a fast loss rate by adjusting its energy to be close to that of a fast readout resonator. The error correction cycle runs as follows: the shadow qubits are set to a low loss rate, the error correction drive is turned on for a full photon loss correction, then the shadow qubit is set to a very fast loss rate $\Gamma_S$ in the tens of megahertz (either though a controllable detuning or driven state transfer to a lossy resonator). This protocol does not dramatically decrease idle error compared to well-chosen continuous drive parameters, but it can have more pronounced effects on gate fidelity, allowing us to implement the timed XCX gate described below.

Error-Transparent Gates for a Single VSLQ

A set of error-transparent one-qubit gates for a VSLQ may include two operators $X_L$ and $Z_L$ that can be applied in combination to produce rotations between any two points on the logical Bloch sphere. Herein, the subscript "L" refers to operation on a logical qubit (e.g., a VSLQ), rather than the physical qubits that form the logical qubit. A natural choice for a pair of "bare" operators is $X_L^{(bare)} = \tilde{X}_l$ and $Z_L^{(bare)} = \tilde{Z}_l \tilde{Z}_r$, where $\tilde{Z}_i = P_i^2 - P_i^0$, the subscript "l" refers to the left physical qubit of a logical qubit, and the subscript "r" refers to the right physical qubit of the logical qubit. These bare operators commute with $H_P$ and anticommute with each other, and sequences of partial rotations constructed from them can implement arbitrary rotations in the logical manifold.

However, these operators are not error-tolerant, since the bare operators $\tilde{X}_i$ and $\tilde{Z}_i$ return zero acting on a $|1\rangle$ state, and their commutator with the single photon loss operator thus has O(1) matrix elements when acting on the logical state manifold. If a photon loss occurs during a gate, the desired operation will not be continuously applied to the VSLQ until the photon loss is repaired. Since the time between the initial loss and its correction is not measurable in the circuit, an unknown fraction of the gate operation is not applied, producing an unheralded quantum error. To construct error-transparent versions, the operators are modified by defining $$X_L = \tilde{X}_l + P_l^1 \tilde{X}_r$$

$$Z_L = \tilde{Z}_l' \tilde{Z}_r' \quad (4)$$

where $\tilde{Z}_l' \equiv P_i^2 + P_i^1 - P_i^0$. Both operations can be implemented by applying additional signals to the VSLQ's central SQUID, and it can be shown that they suffer no loss of fidelity from a single photon loss in either physical qubit.

First consider $X_L$, and consider that a photon loss occurs in the r qubit during the application of $X_L$ as a gate Hamiltonian. Since there are by default no $|1\rangle$ states in the logical state manifold $\{|\psi_L\rangle\}$, the $P_l^1 \tilde{X}_r$ term returns zero, and $[\tilde{X}_l, a_r] = 0$ trivially, so for $[a_r, X_L]|\psi_L\rangle = 0$. Similarly, if a photon is lost from the left qubit, $\tilde{X}_l$ returns zero, but since the logical states are defined by $\tilde{X}_l \tilde{X}_r |\psi_L\rangle = 1$, $\tilde{X}_l |\psi_L\rangle = \tilde{X}_r |\psi_L\rangle$ and thus the system evolves identically under $P_l^1 \tilde{X}_r$ and $[a_l, X_L]|\psi_L\rangle = 0$ as well. Of course, if two or more photons are lost during the gate operation a logical error will occur, so the gate error should shrink as nearly $T_g T_R / T_{1P}^2$ as $T_{1P}$ grows.

Now consider $Z_L$. Assuming photon losses but no photon addition, if one of the transmons is in a $|1\rangle$ state it decayed from a $|2\rangle$ state in the logical state manifold. As $\tilde{Z}'$ returns 1 on both $|1\rangle$ and $|2\rangle$, evolution of a logical state under the operator $\tilde{Z}_l' \tilde{Z}_r'$ is unchanged by a single photon loss in either qubit. Thus, $Z_L$ is similarly protected against single photon losses as $X_L$ is. The performance of these gates against photon loss is shown in FIG. 2.

Figure 2:
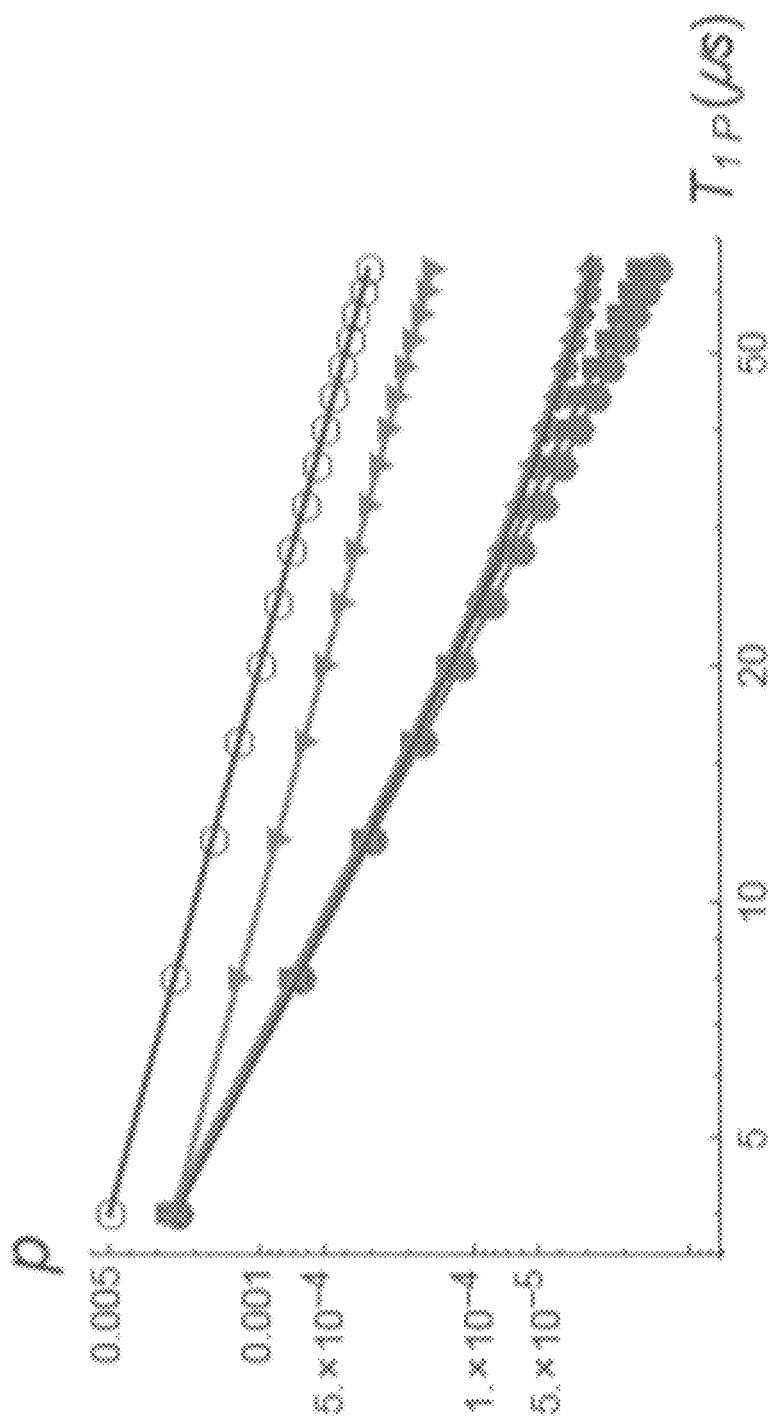
FIG. 2 is a plot of fidelity for single-VSLQ error-transparent gate operations using error-transparent operators, averaged over the logical Bloch sphere, with pulsed error correction drives and a total EC cycle/gate duration of 200 ns.

FIG. 2 is a plot of fidelity for single-VSLQ error transparent gate operations using error-transparent operators (See Eqn. 4), averaged over the logical Bloch sphere, with pulsed error correction drives and a total EC cycle/gate duration of 200 ns. Here, error rates are plotted for idling (blue, filled circles), logical X (gold, filled squares), logical Z (green, diamonds) and logical Hadamard (brown, filled squares; nearly identical to $Z_L$ error rate). For comparison, default error rate $1 - e^{-T_g/2T_{1P}}$ is included for gate durations of 20 ns (purple, triangles) and 40 ns (brown, open circles), assuming no intrinsic gate error.

To make the computation tractable, the simulations restricted the VSLQ transmons to the three-level basis and assumed perfect implementation of the error-tolerant operators. The only significant error source in the simulations was thus random photon loss, as control error is negligible for the long gate durations considered. Errors due to the effect of higher levels are very small and can be eliminated by numerical optimization schemes such as GRAPE (N. Khaneja, T. Reiss, C. Kehlet, T. Schulte-Herbruggen, and S. J. Glaser, J. Mag. Res. 172, 296 (2005)).

Two-Qubit Gates: Opaque Operations Timed with Error Correction

Implementing a realistic two-VSLQ entangling gate based on the error tolerant operators of Eqn. 4 is a subtle challenge. The essential reason for this is that the error tolerant $X_L$ and $Z_L$ are constructed from two-qubit operations, and products of them acting on two VSLQs involve three-qubit and four-qubit operations that are difficult to implement. One could engineer these operations using a gadget construction as in E. Kapit, J. T. Chalker, and S. H. Simon, Phys. Rev. A 91, 062324 (2015), but doing so increases circuit complexity and the gadget degrees of freedom introduce additional error channels. This route shall thus be avoided here.

The first method for engineering error-transparent gates is to use the bare, "opaque" operators $\tilde{X}_{LA}$ and $\tilde{X}_{LB}$ (for VSLQ copies A and B), but timing their operation to coincide with when error correction pulses minimize the instantaneous likelihood of finding a qubit in a $|1\rangle$ state. The ideal entangling XCX gate is defined as $$XCX = \exp\left[i\frac{\pi}{4}(X_{LA} - X_{LB} - X_{LA}X_{LB})\right]. \quad (5)$$

The one-qubit parts of Eqn. 5 may be implemented with error-transparent operations, but the entangling two-qubit part cannot without including four-body terms. To the physical gate, the pulse $$f(t)(X_{LA} - X_{LB}) - (g_1(t)\tilde{X}_{lA}\tilde{X}_{lB} + g_2(t)\tilde{X}_{rA}\tilde{X}_{rB}) \quad (6)$$

is applied, where f(t), $g_1(t)$, and $g_2(t)$ are gate envelope functions, as shown in FIG. 1. More particularly, in FIG. 1, the blue (orange) curves are the time-dependent Rabi frequencies error correction (EC) pulses on the left (right) physical qubit of each of the VSLQs. Green and red curves show $g_1(t)$ and $g_2(t)$ in the timed XCX operation (see Eqn. 6), which apply $\tilde{X}_{lA}\tilde{X}_{lB}$ and $\tilde{X}_{rA}\tilde{X}_{rB}$ terms to couple the two VSLQs. Finally, the purple and brown curves show the ZZ coefficient g(t) in Eqn. 8 for gate durations of 200 ns and 400 ns, thereby implementing an entangling CZZ gate. As this gate is generated by second-order terms in perturbation theory, the bare coupling is larger than the XCX terms (which commute with $H_P$); since W=25 MHz, the total phase rotation of π/4 is identical. These waveforms were used in the fidelity simulations of FIG. 3, and are simple Gaussian (EC and XCX) or quadratic (CZZ) profiles which could likely be further improved through numerical optimization. Note that even in the absence of additional terms, these pulses may have an advantage over ordinary two-qubit gates between one-qubit transmons since in those cases a single-photon loss which occurs at any time during the gate is a logical error that ruins the fidelity of the gate. In contrast, a photon loss which occurs during an $\tilde{X}$ operation inhibits further state evolution through the $\tilde{X}$ operator until the photon loss is corrected, but does not affect the other physical qubit in the VSLQ and thus does not prevent the parent state from being recovered. In other words, single-photon losses cause the gate to be only partially applied, with a fidelity loss that depends on when the photon loss occurs during the gate process. From this, two conclusions can be drawn: (i) photon losses which occur toward the end of a gate (after most of the gate operation has already occurred) will do little to reduce the fidelity, and (ii) if error correction is applied during the gate operation, it can halt further fidelity loss from a prior photon loss.

Numerical simulations support this prediction. For Gaussian gate and EC pulses, the best timing achievable was to apply the $\tilde{X}_{LA}\tilde{X}_{LB}$ pulses in approximately last third of each EC pulse, with the total gate operation spread out over multiple EC pulses. The results of the simulations are shown in FIG. 3, where superlinear reductions in gate error increase linearly with $T_{1P}$, with a net error rate of $p \simeq 5.3 \times 10^{-4}$ for $T_{1P} = 64$ µs.

Figure 3:
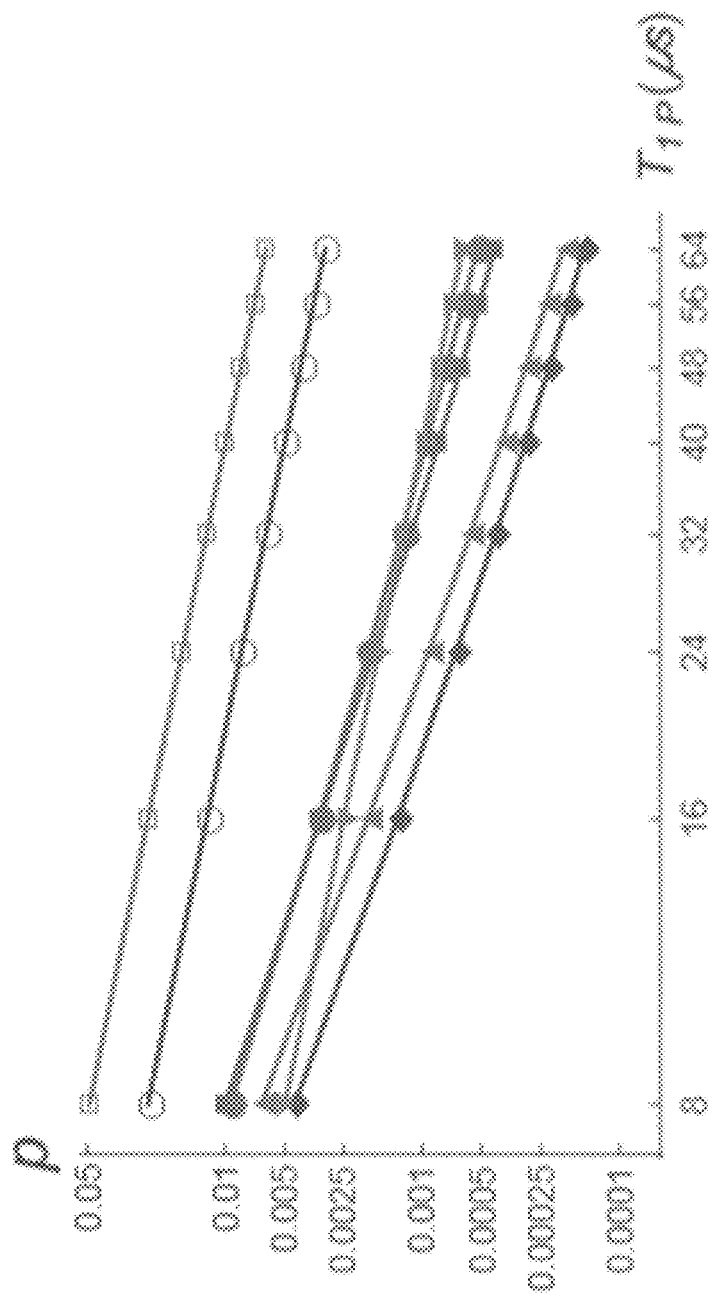
FIG. 3 is a plot of fidelity of two-qubit gates for photon loss rate $T_{1P}$ between 8 and 64 µs.

FIG. 3 is a plot of fidelity of two-qubit gates, for photon loss rate $T_{1P}$ between 8 and 64 µs. Here, the average error rate p per two-qubit gate for XCX split is plotted over two EC pulses (blue, filled circles), XCX split over four EC pulses (orange, squares), CZZ split over two EC pulses (green, diamonds) and four pulses (red, triangles), and bare two-qubit gate error $1 - e^{-T_g/T_{1P}}$ for $T_g = 40$ ns (purple, triangles), 200 ns (brown, open circles), and 400 ns (blue, open squares). The bare two-qubit gate error is included for comparison purposes and plots the expected gate error from single-qubit photon losses occurring during an ordinary two-qubit gate such as CZ, with dephasing and control errors absent. CZZ gates with continuous error correction (not shown) have slightly worse scaling; their error rate is nearly identical at $T_{1P}=8$ µs but is about 60% higher at $T_{1P}=64$ µs.

Gate fidelity was found by evolving the system's Lindblad equation until the decay rate equilibrates (eliminating spurious short-time behavior), performing the gate and averaging the resulting error rate over all thirty-six combinations of initial X, Y, Z eigenstates the two VSLQ copies. These results can be compared to the error rate of ordinary two-qubit gates subject to single qubit photon losses. In these gates, in absence of control and leakage errors, increasing the gate duration always increases the error rate through proliferation of single qubit errors. In contrast, for the XCX operation between VSLQ copies, doubling the gate duration decreases the error rate once $T_{1P}$ is sufficiently high, likely due to suppression of higher order processes (single-VSLQ logical error is a nearly negligible contribution here). The resulting gate error rate for 400 ns XCX with $T_{1P}=64$ µs is about 85% of the error rate for an ordinary two-qubit gate of one-tenth the duration.

The example signal structures that would implement these operations are as follows:

(1) Benchmarking Gates

In one embodiment, a physical implementation of the two-qubit gate set uses tunable, flux-driven couplers, such as those demonstrated in C. McKay, S. Filipp, A. Mezzacapo, E. Magesan, J. M. Chow, and J. M. Gambetta, arXiv: 1604.03076 (2016), and in Y. Chen, C. Neill, P. Roushan, N. Leung, M. Fang, R. Barends, J. Kelly, B. Campbell, Z. Chen, B. Chiaro, et al., Phys. Rev. Lett. 113, 220502 (2014). To benchmark the gates, the following protocol was adopted. For a given $\Gamma_p$, gate waveform, and error correction protocol, an initial density matrix was generated by initializing each copy in the $\tilde{X}=+1$ ground state and evolving it under error correction until the decay rate equilibrates (eliminating short-time behavior related to residual shadow qubit populations and the choice of operator being measured). Empirically this occurs in fewer than ten error correction cycles, so ten simulated error correction cycles were run to prepare initial density matrices. The resulting density matrix $\rho_0$ was stored, and then idealized error-tolerant rotations were used to prepare each copy in one of the six canonical directions on the Bloch sphere. The initial fidelity was then measured using projection operators $(1\pm O_L)=2$ (where $O_L$ is one of the error-transparent $X_L$, $Y_L$ or $Z_L$), evolve the system for one full gate operation, apply the ideal transformation of Eqn. 5 (or its ZZ equivalent) to invert the physical gate, and then measure the projection operators again. The difference in fidelities, averaged over all 36 initial directions, yields the average error per two-qubit gate. This approach was chosen over simulating randomized benchmarking because of the large computational cost of numerically integrating the Lindblad equation, given that the Hilbert space of two VSLQ copies and their attendant shadow qubits contains $36^2=1296$ elements; this method requires significantly fewer Lindblad evolutions.

(2) Phase Noise

Figure 4:
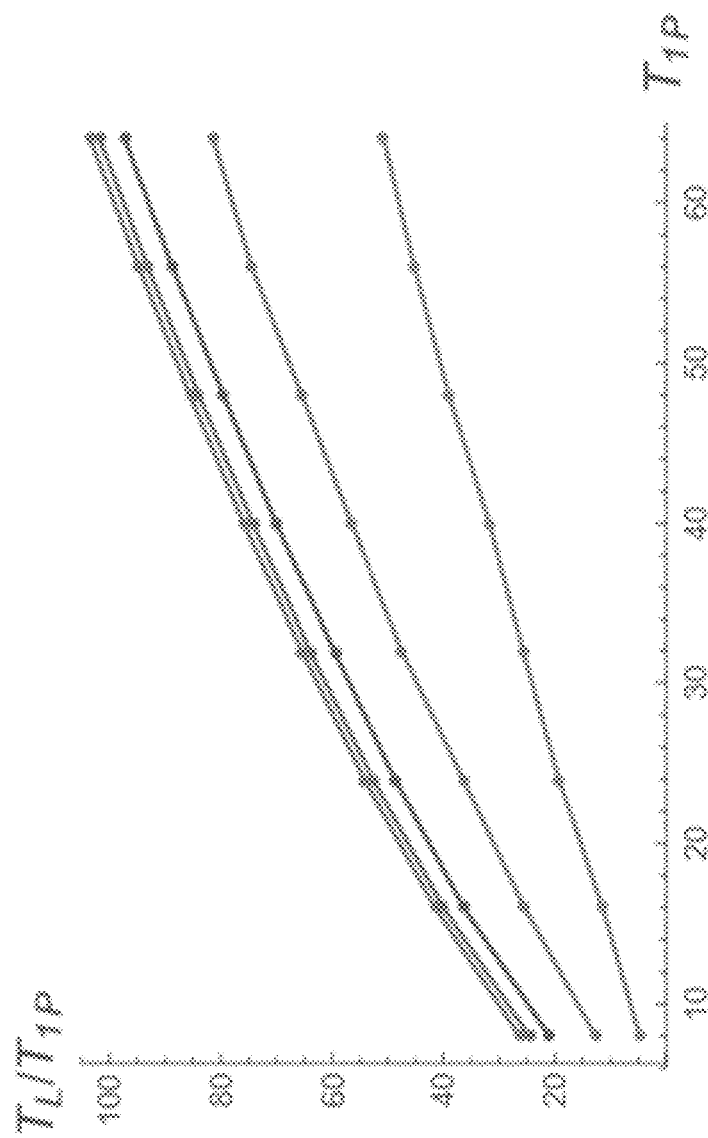
FIG. 4 is a plot of lifetime of $\tilde{X}$ eigenstates under photon losses and 1/f phase noise.

FIG. 4 is a plot of lifetime of $\tilde{X}$ eigenstates under photon losses and 1/f phase noise. The plot shows the extracted lifetime improvement, $T_L/T_{1P}$ of a $\tilde{X}$ eigenstate under photon losses with a rate $1/T_{1P}$ and 1/f phase noise affecting both qubits with an average strength chosen such that the single qubit Ramsey $T_{2R}$ (free induction decay, assuming no photon loss) which is infinite (blue) or $T_{2R}=\{1, \frac{1}{2}, \frac{1}{4}, \frac{1}{8}\}T_{1P}$ (top to bottom; gold, green, red and purple). Note that the transmons in the VSLQ experience twice the effective phase noise of a single qubit because the logical states are in the two-photon manifold. The lifetime is computed by numerically integrating the Lindblad equations with randomly fluctuating $h_{l/r}(t)a_{l/r}^\dagger a_{l/r}$ terms added, with the trajectory averaged over 400 random pairs of phase error signals per data point. Since single-VSLQ error is a small fraction of the total error in multi-qubit gates, and even relatively strong 1/f noise does not prevent large lifetime increases, neglecting 1/f noise in the two-qubit gate simulations is justified.

As predicted in the original work, the combination of a strong driving term (the 25 MHz W coupling) and rapid error correction suppress the effect of phase noise, so that even relatively strong phase noise does not prevent dramatic increases in state lifetime. To compute these values, a single VSLQ copy in an $\tilde{X}$ eigenstate was initialized and as allowed to evolve under photon losses, continuous passive error correction, and 1/f phase noise acting on each of the two primary qubits, with $\langle \tilde{X}(t) \rangle$ averaged over 400 random noise traces before fitting to extract a lifetime. It can be seen from these results that even a modest $T_{2R}$ of a few microseconds still allows for order-of-magnitude increases in state lifetime, and since single VSLQ logical errors are a small contribution to the total two-qubit gate error rate, it is expected that the high two-qubit gate fidelities derived elsewhere in this work will be only modestly affected by phase noise. This is reassuring, since it is expected that the flux loop couplers integral to the VSLQ's design will be an additional source of 1/f flux noise, so the bare qubit $T_{1P}$ and $T_{2R}$ (in absence of drives and dissipation) may be somewhat lower than single qubits fabricated using the same process and subjected to the same environment.

(3) Implementing Operations $P_l^1\tilde{X}_r$

To implement $P_l^1\tilde{X}_r$, two tones are applied, one through the central coupler of the VSLQ and another which is applied directly to the charge or flux degree of freedom of the right transmon. It is assumed the central coupler has a bias of $\pi/2$ so that all the terms which generate W show up at first or third order (if the central coupler has a 0 or $\pi$ bias, the signal structure will change but the result will be the same). To the Hamiltonian, a term of the following form is added:

$$(\Omega_1 \cos(\phi_l)\sin(\phi_r)+\Omega_2 \sin \phi_r)\cos[2\pi(\omega-\delta/2)t]. \quad (10)$$

Optionally, the $\Omega_2$ term can be implemented through coupling to $Q_r$ instead of sin $\phi_r$. The single-photon transition induced by this drive is off-resonant, but the two-photon transition produced by squaring this operator is not, so it can be treated perturbatively. The result, taking into account mixing with higher levels, has the form $$H_{eff} = g\frac{(\Omega_1 \cos(\phi_l) + \Omega_2)^2}{\delta}(d_1\tilde{X}_r + d_2\tilde{Z}_r), \quad (11)$$

where $d_1$, $d_2$, and g are dimensionless prefactors that can be computed in perturbation theory. For realistic parameters $d_1 \gg d_2$, so $d_2$ can effectively be ignored (or cancelled through the method described below). If $\cos(\phi_l)$ is written as a diagonal matrix, the ratio of $\Omega_1$ to $\Omega_2$ may be chosen to obtain $H_{eff}=106$ '$(1-P_l^1)\tilde{X}_r$. By combining this with an ordinary $\tilde{X}_r$ term generated through other means (such as additional single-photon drives), the term $P_l^1\tilde{X}_r$ is obtained.

Implementing $\tilde{Z}_{lA}"\tilde{Z}_{lB}"$, $\tilde{Z}_l'\tilde{Z}_r'$, and XCX One way to implement the $\tilde{Z}_{lA}"\tilde{Z}_{lB}"$ coupling is through a tunable mutual inductor, such as those described in Y. Chen, C. Neill, P. Roushan, N. Leung, M. Fang, R. Barends, J. Kelly, B. Campbell, Z. Chen, B. Chiaro, et al., Phys. Rev. Lett. 113, 220502 (2014). Alternatively, any rapidly tunable coupling element could be used. The coupling takes the form $$H_{ab} = f_l(t)(\phi_{lA}\phi_{lB}) + f_r(t)(\phi_{rA}\phi_{rB}), \quad (12)$$

where $\phi_{lA}$ and $\phi_{lB}$ are the phase operators of the left physical qubit of VSLQs A and B, respectively. Similarly, $\phi_{rA}$ and $\phi_{rB}$ are the phase operators of the right physical qubit of VSLQs A and B, respectively. Assuming the plasma frequency of the coupler junction is suitably large, these couplers can be driven at high frequencies. Further, because there is no physical current flow across the mutual inductance, no unwanted terms arise from flux quantization requirements around large loops. Such a design is thus scalable for a large system.

To implement the $\tilde{Z}_{lA}"\tilde{Z}_{lB}"$ for a CZZ gate with two logical qubits (e.g., VSLQs) labeled A and B, a left tunable coupler that couples the logical qubits A and B may be driven with a left drive $f_l(t)$, and a right tunable coupler that also couples the logical qubits A and B may be driven with a right drive $f_r(t)$, where $$f_l(t) = \Omega_0 \cos[2\pi(\omega_{lA} + \omega_{lB} + 2\gamma_l)t]$$

$$f_r(t) = \Omega_0 \cos[2\pi(\omega_{rA} + \omega_{rB} + 2\gamma_r)t] \quad (13)$$

Here, $\omega_{lA}$ and $\omega_{lB}$ represent the energy spacings between the two lowest-energy quantum states of the left physical qubit of the logical qubits A and B, respectively. Similarly, $\omega_{rA}$ and $\omega_{rB}$ represent the energy spacings between the two lowest-energy quantum states of the right physical qubit of the logical qubits A and B, respectively. Furthermore, $\gamma_l$ and $\gamma_r$ are detunings such that the left and right drives are off-resonant from the two-photon transitions at frequencies $\omega_{lA} + \omega_{lB}$ and $\omega_{rA} + \omega_{rB}$, respectively. While driving the circuit off-resonance does not change photon number in either qubit, off-resonant mixing with other levels creates a set of energy shifts in second-order perturbation theory:

$$H_{AB} \simeq \sum_{ij} C_{ij} P_{l/rA}^i P_{l/rB}^j \quad (14)$$

The terms in $H_{AB}$ can be arranged as $$H_{AB} = c_1(P_{l/rA}^1 + P_{l/rB}^1) + c_{ZZ}\tilde{Z}_{lA}"\tilde{Z}_{lB}" + c_z(\tilde{Z}_{l/rA} + \tilde{Z}_{l/rB}) + c_{11}(P_{l/rA}^1 P_{l/rB}^1) + c_0. \quad (15)$$

Of these terms, the $c_{zz}$ coefficient is the target $g(t)$ in Eqn. 8, $c_0$ is a constant which does not change the system's dynamics, $c_1$ is an irrelevant energy shift for $|1\rangle$ states that can be compensated by adjusting the frequency of error correction drives, $c_z$ is a single qubit energy shift between levels 0 and 2 that can be cancelled through other means, and $c_{11}$ is an irrelevant interaction term that only influences the system when both VSLQ copies have lost a photon, causing a gate error. Given a desired $c_{zz}$ and focusing on $C_{00}, C_{01}, C_{02}, C_{12}$ and $C_{22}$, if those terms in Eqn. 14 are equated with their equivalents in Eqn. 15, then a simple system of five equations with five unknowns ($\Omega, \gamma, c_0, c_1, c_z$) is provided that can be used to readily solve to find $\Omega$ and $\gamma$. While the particular values solving these equations depend on the fixed device parameters $E_J$ and $E_C$ for each of the four qubits, for physically realistic $E_J/E_C = 75$ and $E_J = 2\pi \times 18$ GHz, $c_{zz} = 2\pi \times 5$ MHz is obtained from $\Omega_0 \simeq 2\pi \times 75$ MHz (this is reduced to about 12 MHz when matrix elements from $\phi$ are included) and $\gamma \simeq 2\pi \times 50$ MHz. Such values are all experimentally accessible; a $c_{zz}$ coefficient of this strength is sufficient for the 400 ns gate in the text.

Note that this treatment is somewhat abbreviated for simplicity and clarity, and a more sophisticated analysis would take the W terms into account (off-resonant driving is assumed to transiently take a state out of the W=1 manifold but not back into it if acting on a $|1\rangle$ state) in generating the $\tilde{Z}_{lA}"\tilde{Z}_{lB}"$ coefficients. Though not included here, such a treatment has been worked through for realistic device parameters and has been shown to modify the target coefficients only slightly and to not introduce new terms which cannot be cancelled by simple single-qubit operations. It is also noted that the $\tilde{Z}_l'\tilde{Z}_r'$ operation required for single-qubit gates can be engineered through exactly the same protocol (with the drive signal applied through the central SQUID coupler in that case), and such couplers could also be operated in different frequency regimes to enact XCX.

Two-Qubit Gates: Error Transparent Phase Gate

The XCX gate of the previous section is not truly error transparent, since the gate ceases to operate between a photon loss and its correction. To generate an error transparent gate for the VSLQ, it is first noted that, if both VSLQ copies are in the logical state manifold, the entangling $Z_{LA}Z_{LB}$ operation (where the $X_L$ operators in XCX have been replaced with $Z_L$ terms) can be generated as:

$$H_{CZZ}(t) \to g(t)(\tilde{Z}_{lA}\tilde{Z}_{lB} + \tilde{Z}_{rA}\tilde{Z}_{rB}) \simeq -\frac{g(t)^2}{W}\tilde{Z}_{lA}\tilde{Z}_{lB}\tilde{Z}_{rA}\tilde{Z}_{rB} \quad (7)$$

This coefficient is generated perturbatively, with a factor of four from combinatorics canceled by the energy cost 4W of transiently flipping both VSLQ copies into W=−1 states from a $\tilde{Z}_{lA}\tilde{Z}_{lB}$ or $\tilde{Z}_{rA}\tilde{Z}_{rB}$ term. Now imagine that a single photon is lost in one of the VSLQ copies. The action of the ZZ terms now only has an energy cost of 2W, which suggests that if $\tilde{Z}_i" \equiv P_i^2 + P_i^1/2 - P_i^0$ is defined, then the Hamiltonian $$H_{czz}(t) \to g(t)(\tilde{Z}_{lA}"\tilde{Z}_{lB}" + \tilde{Z}_{rA}"\tilde{Z}_{rB}") \simeq -\frac{g(t)^2}{W}\tilde{Z}_{lA}"\tilde{Z}_{lB}"\tilde{Z}_{rA}"\tilde{Z}_{rB}" \quad (8)$$

will have the same perturbative coefficient (to second order in g, at least) and return the same phase evolution even if a single photon is lost, as the coefficient is cut in half when acting on a $|1\rangle$ state and a $|1\rangle$ state is only present due to decay from $|2\rangle$ states (hence the replacement of $\tilde{Z}"$ with $\tilde{Z}'$). Eqn. 8 is only correct if one or zero photons have been lost (from any of the four transmons); if two photons are lost the gate will not operate as intended, but at high $T_{1P}$ this is rare and the gate error will decrease nearly quadratically in increasing $T_{1P}$.

The performance of these gates can be benchmarked numerically. Using the profile shape in FIG. 1, superlinear scaling of gate error is demonstrated, with the errors rate for a CZZ gate split over two or four EC pulses (200 or 400 ns total gate time) are best fit by $p(T_{1P}) = 0.0057/T_{1P} + 0.253/T_{1P}^2$ (p=1.48×10$^{-4}$ at $T_{1P}$=64 μs) and $0.0064/T_{1P} + 0.380/T_{1P}^2$, respectively. The quadratic term thus dominates until $T_{1P}$ is large. The linear term can be attributed to higher order perturbative corrections; gate error in the absence of random error processes is of order $10^{-7}$.

State Measurement

As an example of measuring the state of a VSLQ, the protocol described in N. Didier, J. Bourassa, and A. Blais, Phys. Rev. Lett. 115, 203601 (2015) is adopted, and a coupling between each qubit and a common readout resonator is implemented, having the form $$H_M = m(t)(\tilde{X}_{l} + \tilde{X}_r)(a_R^\dagger + a_R). \quad (9)$$

To measure the state, m(t) is ramped from zero to a finite value and the resulting resonator signal is then measured. In absence of photon losses, this tracks the $\tilde{X}$ eigenvalue, and the phase of the resonator will evolve toward the target value. If a single photon is lost, one of the $\tilde{X}$ operators will return zero, but the other will continue to operate normally, and the pointer state will evolve in the appropriate direction (though at half the rate). One can thus accurately capture the $\tilde{X}$ eigenvalue of the parent logical state by simply measuring for a long enough time to achieve the appropriate contrast even with the drive strength cut in half. Ignoring higher order corrections (that can in general be suppressed through pulse shaping or by adding further signals), measurement error is thus expected to scale as $T_M/T_{1P}^2$, where $T_M$ is the characteristic measurement time that depends on the resonator damping rate κ and other experimental considerations. One can achieve similar scaling by measuring $\tilde{X}_l$ and $\tilde{X}_r$ independently, or by mapping the $\tilde{X}_{l/r}$ eigenvalues to the state of two ordinary transmons, which are then measured by dispersive shift.

The simulated performance of these gates is extremely promising, with two-qubit gate error rates in the low $10^{-4}$ range achievable without further increasing $T_1$ beyond what has already been achieved in contemporary experiments. Combined with robust measurement protocols, the essential ingredients required for a "dissipative subsystem code" have been outlined, where VSLQ copies replace single qubits in a topological code, improving the fidelity of each code operation by an order of magnitude. Embodiments here may also be arranged to implement continuous, "analog" operations such as quantum simulation and annealing, wherein passive error correction mechanisms are run during the operation as a continuous "cooling" source, to improve the stability and performance of the desired operations.

Physical Implementation

Figure 5:
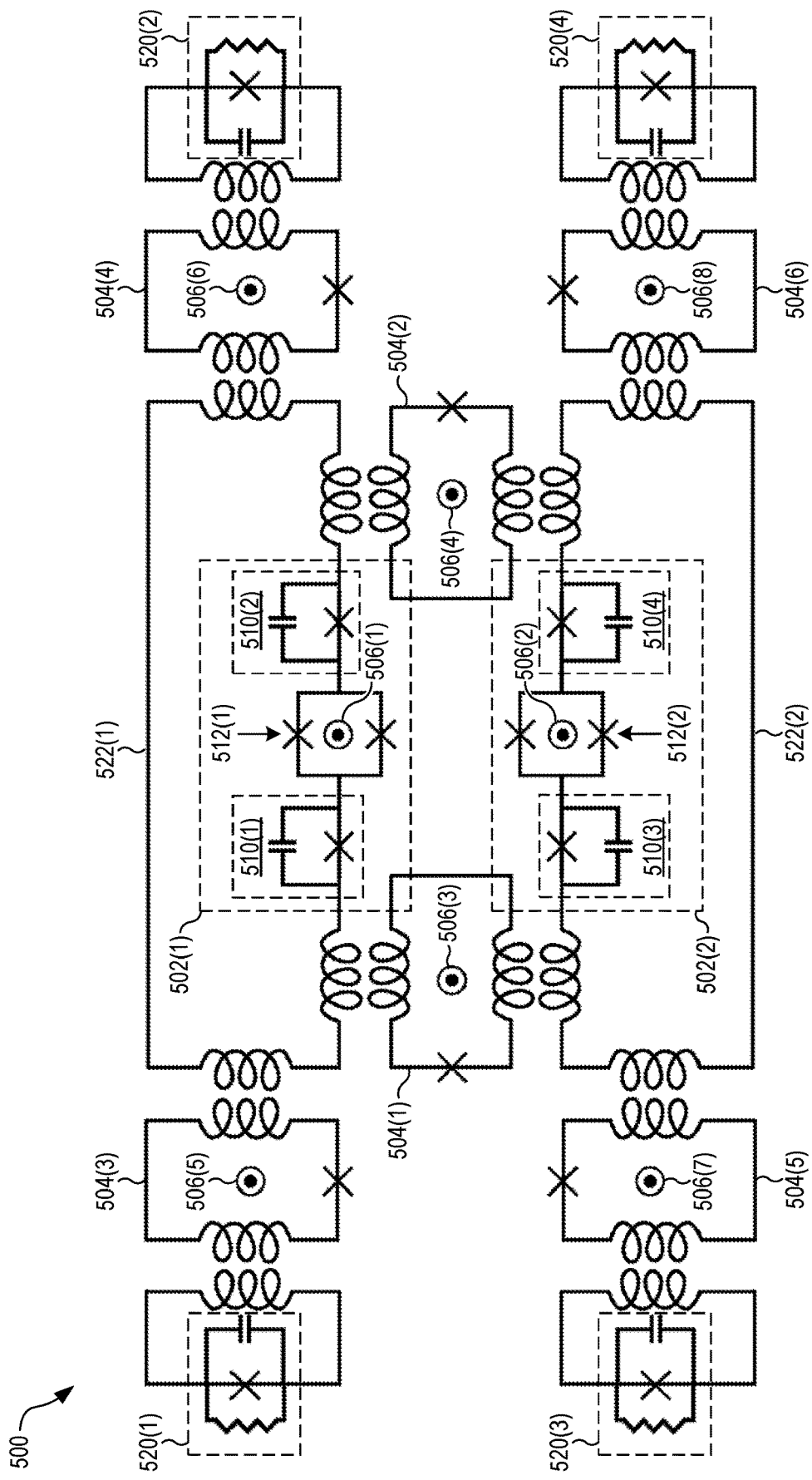
FIG. 5 is a functional diagram showing one example quantum circuit 500 that implements the error-transparent CZZ described herein with physical qubits, in embodiments.

FIG. 5 is a functional diagram showing one example quantum circuit 500 that implements the error-transparent CZZ described above with physical qubits. Quantum circuit 500 may also implement the non-error-transparent XCX gate with error correction pulses, as described above. Quantum circuit 500 includes a first logical qubit 502(1) that is shown in FIG. 5 as a first VSLQ formed from first and second physical qubits 510(1), 510(2) coupled together with a first DC SQUID 512(1). First and second physical qubits 510(1), 510(2) may share a first common bridged ground 522(1). A coupling strength between first and second physical qubits 510(1), 510(2) is controlled via a first oscillating flux 506(1) that threads a loop of first DC SQUID 512(1). Quantum circuit 500 also includes a second logical qubit 502(2) that is shown in FIG. 5 as a second VSLQ formed from third and fourth physical qubits 510(3), 510(4) coupled together with a second DC SQUID 512(2). Third and fourth physical qubits 510(3), 510(4) may share a second common bridged ground 522(2). A coupling strength between third and fourth physical qubits 510(3), 510(4) is controlled via a second oscillating flux 506(2) that threads a loop of second DC SQUID 512(1). While FIG. 5 shows DC SQUIDs 512(1), 512(2) coupling physical qubits 512(1), another type of tunable coupler may be used without departing from the scope hereof.

While FIG. 5 shows each of physical qubits 510 as a transmon with a single Josephson junction, each of physical qubits 510 may alternatively be a transmon with two Josephson junctions. Alternatively, each of physical qubits 510 may be another type of superconducting qubit, such as a charge qubit, flux qubit (e.g., RF-SQUID qubit, double SQUID qubit, etc.), or phase qubit. Alternatively, each of physical qubits 510 may be another type of qubit known in the art, such as a trapped ion, trapped neutral atom, electron, photon, atomic nucleus, quantum dot, NV center in diamond, multi-photon state in a cavity, or any other quantum system with high coherence that is structured for storing and/or processing quantum information.

Quantum circuit 500 also includes first and second tunable flux-driven couplers 504(1), 504(2) that couple first and second logical qubits 502(1), 502(2) together. Specifically, first flux-driven coupler 504(1) couples first and third physical qubits 510(1), 510(3) with a coupling strength that is controlled via a third oscillating flux 506(3) that threads a loop of first flux-driven coupler 504(1). Similarly, second flux-driven coupler 504(2) couples second and fourth physical qubits 510(2), 510(4) with a coupling strength that is controlled via a fourth oscillating flux 506(4) that threads a loop of second flux-driven coupler 504(2).

To implement error correction, quantum circuit 500 includes first and second shadow qubits 520(1), 520(2) that couple unwanted photons from first logical qubit 502(1) to the environment. A third flux-driven coupler 504(3) couples first shadow qubit 520(1) and first logical qubit 502(1) with a coupling strength that is controlled via a fifth oscillating flux 506(5) that threads a loop of third flux-driven coupler 504(3). Similarly, a fourth flux-driven coupler 504(4) couples second shadow qubit 520(2) and first logical qubit 502(1) with a coupling strength that is controlled via a sixth oscillating flux 506(6) that threads a loop of fourth flux-driven coupler 504(4). Quantum circuit 500 also includes third and fourth shadow qubits 520(3), 520(4) that couple unwanted photons from second logical qubit 502(2) to the environment. A fifth flux-driven coupler 504(5) couples third shadow qubit 520(3) and second logical qubit 502(2) with a coupling strength that is controlled via a seventh oscillating flux 506(7) that threads a loop of fifth flux-driven coupler 504(5). Similarly, a sixth flux-driven coupler 504(6) couples fourth shadow qubit 520(4) and second logical qubit 502(2) with a coupling strength that is controlled via an eighth oscillating flux 506(8) that threads a loop of sixth flux-driven coupler 504(6). While FIG. 5 shows each of shadow qubits 520 as a superconducting qubit with a Josephson junction, each of qubits 520 may alternatively be another type of qubit, quantum system, or resonator that couples photons (i.e., excitations) to the environment.

Flux-driven couplers 504 may be any type of rapidly tunable inductor that generates mutual inductances when driven with corresponding oscillating fluxes 506. In one embodiment, each of flux-driven couplers 504 is a "gmon" device described in Y. Chen et al., Phys. Rev. Lett. 113, 220502 (2014). To implement the $\tilde{Z}_{lA}"\tilde{Z}_{lB}"$ term in an error-transparent CZZ gate, first and second flux-driven couplers 504(1), 504(2) may be driven with respective oscillating fluxes 506(3), 506(4) given by the left and right drives $f_l(t)$ and $f_r(t)$ of Eqn. 8 above. These drives are single-frequency signals having frequencies sufficiently detuned (i.e., by detunings $\gamma_l$ and $\gamma_r$) from the two-photon resonances at frequencies $\omega_{lA} + \omega_{lB}$ and $\omega_{rA} + \omega_{rB}$, respectively, to prevent excitation of physical qubits 510 while perturbatively shifting the energy levels of physical qubits 510 to generate a nonlinear term in the interaction Hamiltonian that is proportional to $\tilde{Z}_{IA}"\tilde{Z}_{IB}"$.

While each of oscillating fluxes 506(3), 506(4) is a single-frequency drive in the above example, oscillating fluxes 506(3), 506(4) may have another mathematical form without departing from the scope hereof. For example, each of oscillating fluxes 506(3), 506(4) may be a sum of two single-frequency drives with frequencies whose sum is sufficiently detuned from any two-photon transition to ensure that oscillating fluxes 506(3), 506(4) do not excite physical qubits 510, yet still perturbatively shift the energy levels of physical qubits 510 to generate the nonlinear term $\tilde{Z}_{IA}"\tilde{Z}_{IB}"$. Each of oscillating fluxes 506(3), 506(4) may be formed by combining any number of single-frequency drives with frequencies whose sums are detuned from any multi-photon transition in physical qubits 510. In one embodiment, first flux-driven coupler 504(1) is additionally driven with a DC flux that biases its operation to respond to oscillating flux 506(3) on the side of its tuning curve (i.e., $\phi_f = \pi/2$). When oscillating flux 506(3) has an amplitude less than the, first flux-driven coupler 504(1) responds linearly to oscillating flux 506(3). In another embodiment, first flux-driven coupler 504(1) is driven without a DC flux, wherein first flux-driven coupler 504(1) operates at the top of its tuning curve (i.e., $\phi_f = 0$) such that first flux-driven coupler 504(1) responds nonlinear to oscillating flux 506(3). This nonlinear response will generate harmonics of oscillating flux 506(3) that also perturbatively shift the energy levels of physical qubits 510, and thereby contribute to the generation of the nonlinear term $\tilde{Z}_{IA}"\tilde{Z}_{IB}"$. Second flux-driven coupler 504(1) may be similarly driven with or without a DC flux bias to change the response of second flux-driven coupler 504(1) to oscillating 506(4).

Adding two-photon exchange terms and tuning the drive frequencies to resonance can implement $\tilde{X}_{IA}\tilde{X}_{IB}$. Since the couplings are through mutual inductances, and not Josephson junctions, flux quantization rules are straightforward and issues involving unwanted closed loops do not arise. Although not shown in FIG. 5, quantum circuit 500 may be expanded by coupling each logical qubit 512 to four or more nearest neighbors, as required for topological error correction codes. The quantum states of logical qubits 512 may be measured through coupling to resonators (not shown in FIG. 5), either through tunable mutual inductances or a more complex lumped-element design.

In one embodiment, quantum circuit 500 excludes shadow qubits 520 and four corresponding flux-tunable couplings 506(3), 506(4), 506(5), and 506(6). In this embodiment, quantum circuit 500 can still implement an error-transparent CZZ gate, but not error correction methods described above. This embodiment is advantageous for qubits where errors occur too infrequently to justify the added complexity of shadow qubits 520.

While FIG. 5 shows each of first and second logical qubits 502(1), 502(2) having two physical qubits 510 joined with one coupling (i.e., SQUID 512), first and second logical qubits 502(1), 502(2) may alternatively have any number of physical qubits and couplings. Similarly, while FIG. 5 shows first and second logical qubits 502(1), 502(2) being joined with two couplers 504(1), 504(2), first and second logical qubits 502(1), 502(2) may be alternatively joined with any number of couplers, as determined by the number of physical qubits 510 forming each of logical qubit 502.

Figure 6:
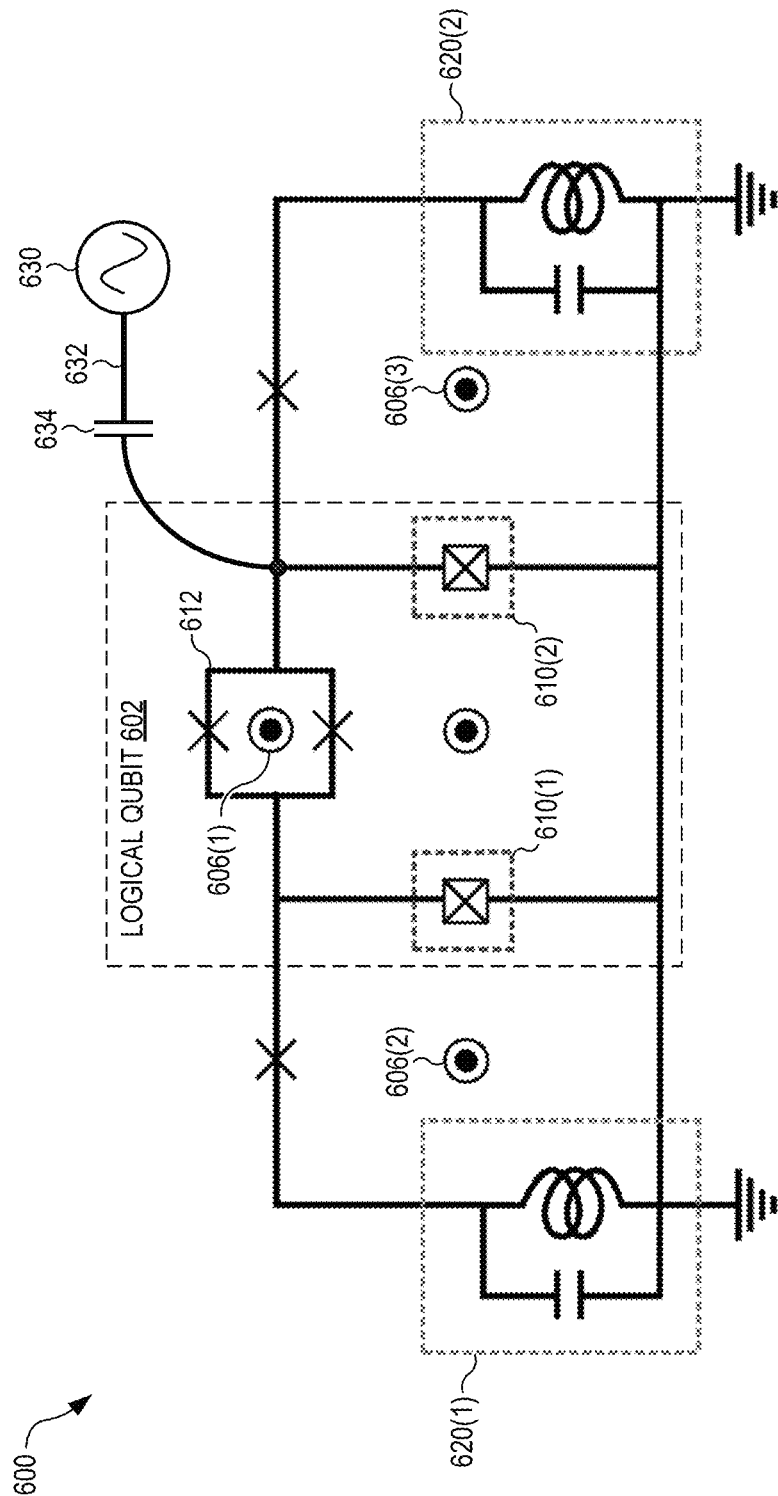
FIG. 6 is a functional diagram showing one example quantum circuit that implements a one-qubit error-transparent gate, in embodiments.

FIG. 6 is a functional diagram showing one example quantum circuit 600 that implements a one-qubit error-transparent gate. Quantum circuit 600 includes a logical qubit 602 that is shown in FIG. 6 as a VSLQ formed from first and second physical qubits 610(1), 610(2) coupled together with a DC SQUID 612(1). A coupling strength between first and second physical qubits 610(1), 610(2) is controlled via an oscillating flux 606(1) that threads a loop of DC SQUID 612. Physical qubits 610(1), 610(2) are similar to physical qubits 510 of FIG. 5, and DC SQUID 612 is similar to DC SQUIDS 512 of FIG. 5.

While FIG. 6 shows each of physical qubits 610 as a transmon with a single Josephson junction, each of physical qubits 610 may alternatively be a transmon with two Josephson junctions. Alternatively, each of physical qubits 610 may be another type of superconducting qubit, such as a charge qubit, flux qubit (e.g., RF-SQUID qubit, double SQUID qubit, etc.), or phase qubit. Alternatively, each of physical qubits 610 may be another type of qubit known in the art, such as a trapped ion, trapped neutral atom, electron, photon, atomic nucleus, quantum dot, NV center in diamond, multi-photon state in a cavity, or any other quantum system with high coherence that is structured for storing and/or processing quantum information.

To implement error correction, quantum circuit 600 includes first and second shadow resonators 620(1), 620(2) that couple unwanted photons from logical qubit 602 to the environment. A second oscillating flux 606(2) is applied, as shown, to couple first shadow resonator 620(1) and logical qubit 602. Similarly, a third oscillating flux 606(6) is applied to couple second shadow resonator 620(2) and logical qubit 602. Shadow resonators 620 may alternatively be shadow qubits, as in FIG. 5.

To implement the $P_l^1\tilde{X}_r$, operation with quantum circuit 600, a signal generator 630 outputs a drive signal 632 that is capacitively-coupled to second physical qubit 610(2) via a capacitor 634. Drive signal 632 thus couples to the charge degree of freedom second physical qubit 610(2). Alternatively, drive signal 632 may be coupled to the flux degree of freedom of second physical qubit 610(2). An additional oscillating flux is also threaded through the loop of DC SQUID 612. To implement $P_r^1\tilde{X}_l$, drive signal 632 may be capacitively coupled in a similar manner to first physical qubit 610(2).

While FIG. 6 shows logical qubits 602 having two physical qubits 610 joined with one coupling (i.e., SQUID 612), logical qubit 602 may alternatively have any number of physical qubits and couplings.

In one embodiment, quantum circuit 600 excludes shadow qubits 620. In this embodiment, quantum circuit 600 can still implement an error-transparent single-qubit gate, but not the error correction methods described above. This embodiment is advantageous for qubits where errors occur too infrequently to justify the added complexity of shadow qubits 620.

In embodiments, a method implements an error-transparent quantum gate with first and second logical qubits. The first logical qubit includes a first plurality of physical qubits, and the second logical qubit includes a second plurality of physical qubits. For example, the method may be implemented with quantum circuit 500 of FIG. 5. The method includes a step of off-resonantly driving one or more tunable couplers with one or more corresponding drive signals to entangle the first plurality of physical qubits with the second plurality of physical qubits. As one example of the step, oscillating fluxes 506(3), 506(4) drive tunable flux-driven couplers 504(1), 504(2) to entangle first and second logical qubits 502(1) and 502(2). The drive signals are configured to implement with the first and second logical qubits an error-transparent quantum gate that operates independently of single errors in the first and second logical qubits. In one of these embodiments, the method includes selecting one or more of a duration, frequency, and amplitude of each of the drive signals to implement the error-transparent quantum gate with the first and second logical qubits. In other embodiment, each of the drive signals includes a plurality of single-frequency drives.

In other embodiments, a method implements an error-transparent quantum gate with a logical qubit. The logical qubit includes at least first and second physical qubits. The method may be implemented with quantum circuit 600 of FIG. 6. The method includes a first step of driving a tunable coupler with a first drive signal to couple the first and second physical qubits. In one example of the first step, oscillating flux 606(1) threads DC SQUID 612 to couple first and second physical qubits 610(1) and 610(2). The method also includes a second step of driving a degree of freedom of one of the first and second physical qubits with a second drive signal. In one example of the second step, drive signal 632 is capacitively coupled to second physical qubit 610(2). In these embodiments, the first and second drive signals are configured to apply to the logical qubit an error-transparent quantum gate that operates independently of single-photon errors in the logical qubit.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An error-transparent two-qubit quantum circuit, comprising:
   a first logical qubit formed from a first plurality of physical qubits;
   a second logical qubit formed from a second plurality of physical qubits; and
   one or more tunable couplers that implement an error-transparent quantum gate that entangles the first plurality of physical qubits with the second plurality of physical qubits, the error-transparent quantum gate being one of a CZZ gate and a XCX gate that operates independently of single errors in the first and second logical qubits.

2. The error-transparent two-qubit quantum circuit of claim 1,
   the first plurality of physical qubits comprising first and second physical qubits; and
   the second plurality of physical qubits comprising third and fourth physical qubits.

3. The error-transparent two-qubit quantum circuit of claim 2, each of the first and second logical qubits being a very small logical qubit (VSLQ).

4. The error-transparent two-qubit quantum circuit of claim 3, each of the first, second, third, and fourth physical qubits being a superconducting qubit.

5. The error-transparent two-qubit quantum circuit of claim 4, wherein:
   each of the first, second, third, and fourth superconducting qubits is a transmon;
   the first logical qubit further includes a first SQUID for coupling the first and second transmons; and
   the second logical qubit further includes a second SQUID for coupling the third and fourth transmons.

6. The error-transparent two-qubit quantum circuit of claim 5, wherein:
   the first and second transmons share a first common bridged ground; and
   the third and fourth transmons share a second common bridged ground.

7. The error-transparent two-qubit quantum circuit of claim 3, each of the first and second tunable couplers being a gmon coupler.

8. The error-transparent two-qubit quantum circuit of claim 3, further comprising:
   first, second, third, and fourth shadow qubits;
   a third tunable coupler for coupling the first shadow qubit and the first logical qubit;
   a fourth tunable coupler for coupling the second shadow qubit and the first logical qubit;
   a fifth tunable coupler for coupling the third shadow qubit and the second logical qubit; and
   a sixth tunable coupler for coupling the fourth shadow qubit and the second logical qubit.

9. The error-transparent two-qubit quantum circuit of claim 8,
   each of the first, second, third, and fourth shadow qubits being a superconducting qubit; and
   each of the first, second, third, and fourth physical qubits being a superconducting qubit.

10. The error-transparent two-qubit quantum circuit of claim 9,
    each of the first, second, third, and fourth shadow qubits being a resonator; and
    each of the first, second, third, and fourth physical qubits being a superconducting qubit.

11. A method for implementing an error-transparent quantum gate with first and second logical qubits, the first logical qubit including a first plurality of physical qubits, the second logical qubit including a second plurality of physical qubits, comprising:
    off-resonantly driving one or more tunable couplers with one or more corresponding drive signals to entangle the first plurality of physical qubits with the second plurality of physical qubits, the drive signals being configured to implement with the first and second logical qubits an error-transparent quantum gate that operates independently of single errors in the first and second logical qubits, the error-transparent quantum gate being one of a CZZ gate and a XCX gate.

12. The method of claim 11, further comprising selecting one or more of a duration, frequency, and amplitude of each of the drive signals to implement the error-transparent quantum gate with the first and second logical qubits.

13. The method of claim 11,
    each of the drive signals being a single-frequency drive; and
    further comprising selecting frequencies of the drive signals so that the drive signals are detuned from two-photon resonances in the physical qubits.

14. The method of claim 11, each of the drive signals comprising a plurality of single-frequency drives.

15. The method of claim 11, wherein driving the one of more tunable couplers with the corresponding drive signals includes driving the one or more tunable couplers with corresponding oscillating fluxes to generate mutual inductance in each of said one or more tunable couplers.

16. The method of claim 11, further comprising:
coupling, prior to driving, the first plurality of physical qubits to form therewith a first logical state manifold of the first logical qubit; and
coupling, prior to driving, the second plurality of physical qubits to form therewith a second logical state manifold of the second logical qubit.

17. A method for implementing an error-transparent quantum gate with a logical qubit, the logical qubit including at least first and second physical qubits, comprising:
driving a tunable coupler with a first drive signal to couple the first and second physical qubits; and
driving a degree of freedom of one of the first and second physical qubits with a second drive signal;
wherein the first and second drive signals are configured to apply to the logical qubit an error-transparent quantum gate that operates independently of single-photon errors in the logical qubit, the error-transparent quantum gate being one of a CZZ gate and a XCX gate.

18. The method of claim 17,
each of the first and second physical qubits being a transmon;
the degree of freedom being one of a charge degree of freedom and a flux degree of freedom; and
driving the tunable coupler with the first drive signal includes driving a tunable flux-driven coupler with a single-frequency oscillating flux that generates mutual inductance.

* * * * *